United States Patent
Zhou

(10) Patent No.: US 8,150,199 B2
(45) Date of Patent: Apr. 3, 2012

(54) METHODS AND APPARATUS FOR IMAGE ENHANCEMENT

(75) Inventor: Jianping Zhou, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1028 days.

(21) Appl. No.: 12/045,366

(22) Filed: Mar. 10, 2008

(65) Prior Publication Data
US 2008/0240603 A1    Oct. 2, 2008

Related U.S. Application Data

(60) Provisional application No. 60/908,732, filed on Mar. 29, 2007.

(51) Int. Cl.
*G06K 9/40* (2006.01)

(52) U.S. Cl. ....... 382/266; 382/260; 382/274; 358/3.26; 358/3.27

(58) Field of Classification Search .......... 382/260, 382/266, 274, 275; 358/3.26, 3.27
See application file for complete search history.

(56) References Cited

U.S. PATENT DOCUMENTS

| | | | |
|---|---|---|---|
| 6,477,279 B2 * | 11/2002 | Go ................................ 382/240 |
| 6,640,145 B2 * | 10/2003 | Hoffberg et al. ................ 700/83 |
| 6,850,252 B1 * | 2/2005 | Hoffberg ........................ 715/716 |
| 7,006,881 B1 * | 2/2006 | Hoffberg et al. ................ 700/83 |
| 7,215,801 B2 * | 5/2007 | Bueno et al. ................... 382/128 |
| 7,436,411 B2 * | 10/2008 | Marshall et al. ............... 345/587 |
| 7,477,802 B2 * | 1/2009 | Milanfar et al. ............... 382/299 |
| 7,522,756 B2 * | 4/2009 | Bueno et al. ................... 382/132 |

* cited by examiner

*Primary Examiner* — Yosef Kassa

(74) *Attorney, Agent, or Firm* — Mima Abyad; Wade J. Brady, III; Frederick J. Telecky, Jr

(57) ABSTRACT

A method and apparatus of enhancing an image, the method comprising applying at least one multi-scale filter bank to at least a portion of an image to detect at least one edge at different scales, and combining the detected edges with said image to yield an enhanced to at least a portion of the image.

10 Claims, 3 Drawing Sheets

METHODS AND APPARATUS FOR IMAGE ENHANCEMENT

CROSS-REFERENCE TO RELATED APPLICATIONS

This application claims benefit of U.S. provisional patent application Ser. No. 60/908,732, filed Mar. 29, 2007, which is herein incorporated by reference.

BACKGROUND

The present invention relates to digital video signal processing, and more particularly to architectures and methods for digital camera front-ends.

Imaging and video capabilities have become the trend in consumer electronics. Digital cameras, digital camcorders, and video cellular phones are common, and many other new gadgets are evolving in the market. Advances in large resolution CCD/CMOS sensors coupled with the availability of low-power digital signal processors (DSPs) has led to the development of digital cameras with both high resolution image and short audio/visual clip capabilities. The high resolution (e.g., sensor with a 2560×1920 pixel array) provides quality offered by traditional film cameras.

FIG. 1 is a typical functional block diagram 100 for digital camera control and image processing, i.e. the "image pipeline" (Prior art). The automatic focus 102, automatic exposure 104 and automatic white balancing 106 are referred to as the 3 A functions. The image processing includes functions, such as, color filter array (CFA) interpolation 108, gamma correction 110, white balancing, color space conversion 112, JPEG/MPEG compression/decompression 114 (JPEG for single images and MPEG for video clips), scaling for monitor/LCD 118, edge detection 120, false color suppression 122, fault pixel correction 124, and optical black clamp 126, analog processing 128, various optic device 130, and lens distortion correction 132.

Color CCD 116 typically consists of a rectangular array of photosites (pixels) with each photosite covered by a single-color filter (the CFA): typically, red, green, or blue filters are used. In the commonly-used Bayer pattern CFA, one-half of the photosites are green, one-quarter are red, and one-quarter are blue. Each photosite in the sensor detects the incident light amplitude of an input scene for its color, and the sensor output provides a Bayer-pattern image with single-color pixels corresponding to the photosite locations. Subsequent CFA interpolation provides the two other color amplitudes for each pixel to give the full-color image of the input scene.

Typically, digital cameras provide a capture mode with full resolution image or audio/visual clip processing with compression and storage, a preview mode with lower resolution processing for immediate display, and a playback mode for displaying stored images or audio/visual clips. Sharp images are images that are compelling to human eyes. Traditional edge enhancement methods, such as, unsharp masking, are used widely in biological and medical applications. Such methods, usually, apply a highpass filter to the image and incorporate the direct or modified filtering output to the image.

These methods may enhance image sharpness with user input, but also may result in unnatural images due to noise or halo artifacts. Although these artifacts may be acceptable for some applications, many users find such artifacts unacceptable and prefer more pleasing images. In addition, digital cameras may be used in very different lighting conditions and capture images contain different contents; thus, edge enhancement for digital cameras becomes more challenging.

Therefore, there is a need for a method and a system for improved edge detection and image enhancement.

SUMMARY

Embodiment of the present invention is a method and apparatus of enhancing an image. The method comprising applying at least one multi-scale filter bank to at least a portion of an image to detect at least one edge at different scales, and combining the detected edges with said image to yield an enhanced to at least a portion of the image.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE DRAWINGS

Figure 1:
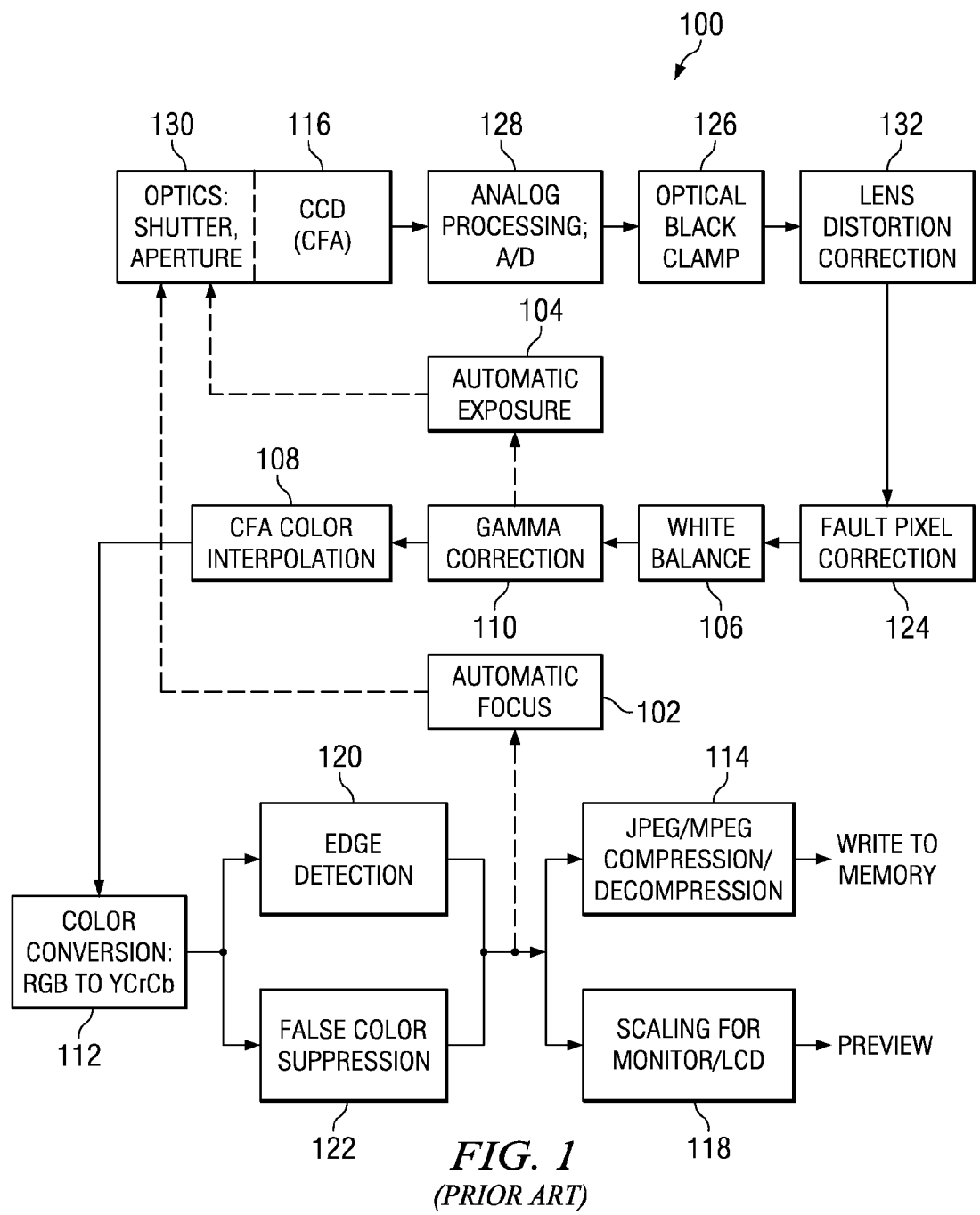
FIG. 1 is a typical functional block diagram for digital camera control and image processing, i.e. the "image pipeline" (Prior art)
Figure 2:
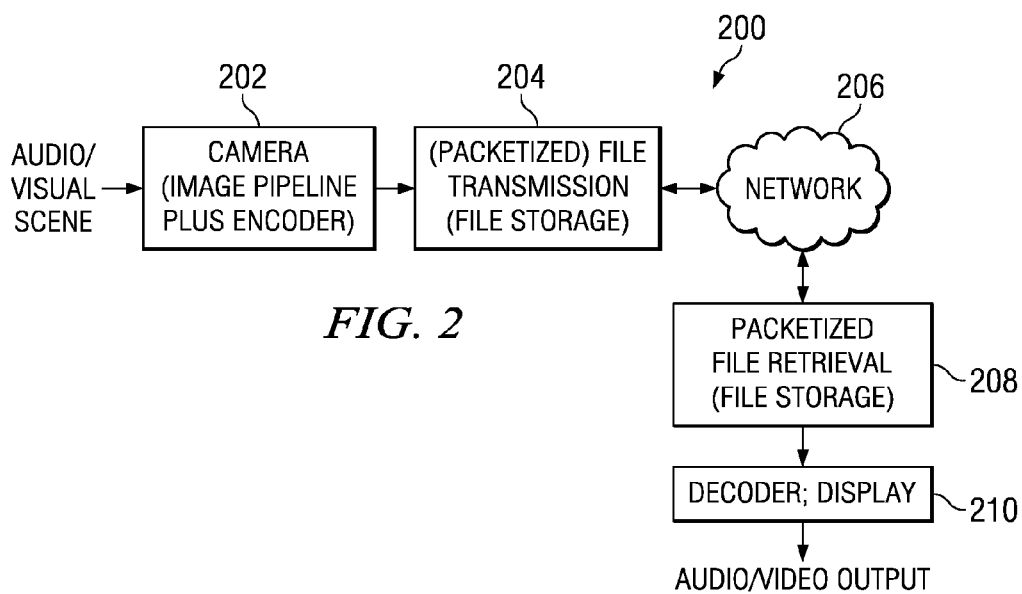
FIG. 2 is an exemplary embodiment of a block diagram of an image enhancement system.

FIG. 2 is an exemplary embodiment of a block diagram of an image enhancement system 200. The system 200 includes a camera 202, file transmission storage 204, network 206, file retrieval storage 208, and decoder 210. In one embodiment, system 200 may be a camera of a mobile phone, a digital camera, PDA, mobile computers, etc. The camera 202 may include digital signal processors (DSPs), general purpose programmable processors, application specific circuits, or systems on a chip (SoC), such as, combinations of a DSP and a RISC processor together with various specialized programmable accelerators.

The camera 202 captures an audio or visual scene. The camera 202 pipelines and encodes the image. The file transmission storage 204 receives a packetized file. The file transmission storage 204 may be coupled or internal to the camera 202. System 200 may or may not include the network 206. The network 206 may facilitate data transmission from the camera 202 to the decoder 210. However, the camera 202 may be coupled or may wirelessly communicate with the decoder 210. The file retrieval storage 208 may be the same as the file transmission storage 204. The file retrieval storage 208 may be internal or may be coupled to the decoder 210. The decoder 210 decodes the encoded image captured from the camera 202. The camera 202 or decoder 210 may include the method 400, which is further discussed in FIG. 4.

Figure 3:
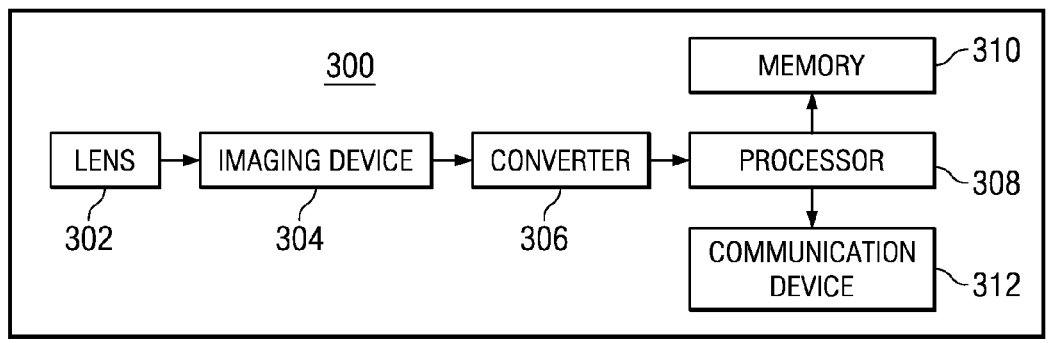
FIG. 3 is an exemplary embodiment of a diagram of a camera system in accordance with the current invention.

FIG. 3 is an exemplary embodiment of a diagram of a camera system 300 in accordance with the current invention. The camera system 300 includes a lens 302, imaging device 304, converter 306, processor 308, memory 310, and communication device 312. Even though FIG. 3 depicts one of each of the above listed elements, the camera system 300 may include any number of such elements. The lens 302 and imaging device 304 are utilized in capturing an image. Converter 306, such as, analog-to-digital and digital-to-analog converters, may provide coupling to the real world. Whereas, modulators and demodulators (plus antennas for air interfaces) may provide coupling for transmission waveforms. A stored program in the memory 310, such as, onboard, external (flash EEP) memory, ROM or FRAM, may implement the signal processing. The camera system 300 may also include packetizers, which may provide formats for transmission via communication device 312 over networks, such as, the Internet. In addition, the camera system 300 may include executable instructions in the memory 310 that function as multi-scale filter banks to the digital image to detect edges at different scales. The processor 308, memory 310, and communication device 312 may be external and/or coupled to the camera system 300. The memory 310 and/or processor 308 may be utilized to process method 400, which is described in FIG. 4.

Figure 4:
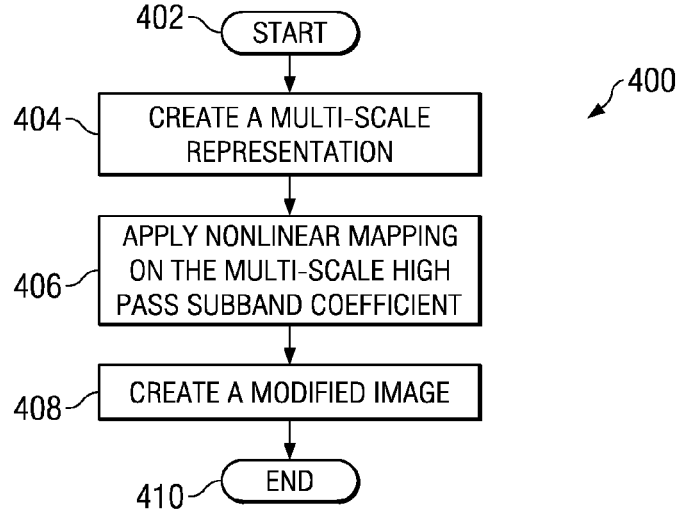
FIG. 4 is an exemplary embodiment of a method for enhancing images.

FIG. 4 is an exemplary embodiment of a method 400 for enhancing images. The method 400 is an image enhancement method that applies multi-scale filter banks to an input image to detect edges at different scales and combine detected edges with the image to yield an edge-enhanced image. Method 400 may be utilized to ignore noise, boost weak edges, and/or ignore strong edges. The method 400 may be utilized by a processor in a camera, computer, mobile device, and the like.

The method 400 starts at step 402 and proceeds to step 404. At step 404, the method creates a multi-scale representation. The multi-scale representation utilizes a multi scale filter bank. Hence, such a multi-directional filter is applied to distinguish noise from an edge.

As such, the method 400 computes a hierarchical representation of the image by filtering the image using the following two-tap filters:

fL=[1 1]
fH=[1 −1], fL is a low-pass filter, and fH is a high-pass filter.

These filters are applied separately for the vertical and horizontal directions. Assume that the original image is denoted by X. The method 400 may create the first level of the hierarchical representation and apply the filters in the following way:

Filter X vertically by fL to create X_VI
Filter X vertically by fH to create X_vH
Filter X_vL horizontally by fL and divide the result by 2 to create X_vL_hL
Filter X_vL horizontally by fH and divide the result by 2 to create X_vL_hH
Filter X_vH horizontally by fL and divide the result by 2 to create X_vH_hL
Filter X_vH horizontally by fH and divide the result by 2 to create X_vH_hH One lowpass subband X_vL_hL, and three directional highpass subbands, X_vL_hH, X_vH_hL, and X_vH_hH, form the first level of representation.

After creating the first level, method 400 may create a second level by applying the same filtering procedure on the lowpass subband X_vL_hL instead of X. Also, upsample the two tap filters by two as follows:

fL=[1 0 1]
fH=[1 0 1]

Continue in this manner to create higher levels of edge characterization. Each time, the method 400 uses the lowpass subband X_vL_hL of the lower level for filtering. Also, the method 400 may upsample the filters by two. Thus, at level N, there are $2^{N-1}-1$ zeros in each filter.

The method 400 may compute 3, 4, or any number of levels. As a result of the above calculation, step 404 produces a lowpass subband and multiple highpass subbands.

The method 400 proceeds from step 404 to step 406. In step 406, the method 400 applies nonlinear mapping on the multi-scale highpass subband coefficients. To modify the coefficients, the method 400 starts at the first level, for each coefficient x in each of three directional subbands, and apply a nonlinear mapping function to x.

$x=f(x)$

Function f(x) may monotonically increase on x and may modify the sign of x. For example:

If $x>thres1$, $f(x)=x+intercept3$;

Else if $x<thres1$, $f(x)=x-intercept3$;

Else if $x>thres2$, $f(x)=slope2*x+intercept2$;

Else if $x<-thres2$, $f(x)=slope2*x-intercept2$;

Else if $x>thres1$, $f(x)=slope1*x+intercept1$;

Else if $x<-thres1$, $f(x)=slope1*x-intercept1$;

Else, $f(x)=0$;

In this embodiment, intercept1, intercept2, intercept3, slope1, and slope2 are parameter. One of ordinary skill in the art would know that different parameters may be chosen at different levels. The parameters may be selected based on the noise standard deviation and user preference. Suppose the image noise standard deviation is nstd, the method 400 may select the parameters as follows:

slope1=4/3;

intercept1=−4*nstd/3;

slope2=(60−4*nstd)/(30−4*nstd);

intercept2=−4*nstd*30/(30−4*nstd);

intercept3=30;

The method 400 may then progress to higher levels and modify the coefficients using the same nonlinear mapping function.

The method 400 proceeds from step 406 to step 408. In step 408, the method 400 creates a modified image. The method 400 utilizes the modified multi-scale highpass subbands and the unchanged lowpass subband to create the final image. The method 400 may use the following procedure at the highest level of the representation:

Filter X_vL_hL vertically by fL to create X_vL_hL_vL
Filter X_vL_hL_vL horizontally by hL to create X_vL_hL_vL_hL
Filter X_vL_hH vertically by fL to create X_vL_hH_vL
Filter X_vL_hH_vL horizontally by hH to create X_vL_hH_vL_hH
Filter X_vH_hL vertically by fH to create X_vH_hL_vH
Filter X_vH_hL_vH horizontally by hL to create X_vH_hL_vH_hL
Filter X_vH_hH vertically by fH to create X_vH_hH_vH
Filter X_vH_hH_vH horizontally by hH to create X_vH_hH_vH_Hh Add X_vL_hL_vL_hL, X_vL_hH_vL_hH, X_vH_hhL_vH_hL, and X_vH_hH_vH_hH. Then, divide the result by 8 to obtain Y. Note that fH and fL are now defined as follows:

fL=[1 1]

fH=[1 −1], fL is a low-pass filter, and fH is a high-pass filter

Also, at level N, fL and fH may need to be upsampled by $2^N$. After finishing the highest level, the method 400 proceeds to lower levels. At each level, X_vL_hL is set to be equal to Y that was obtained at the higher level. Once the filtering at the lowest level is finished, the Y matrix forms the final image.

This filtering scheme may be applied to the image data in any format, such as, Bayer, RGB, YUV etc. For each format, the filtering may be applied to each color component separately. The method 400 proceeds to step 410. The method 400 ends at step 410.

Figure 5A:
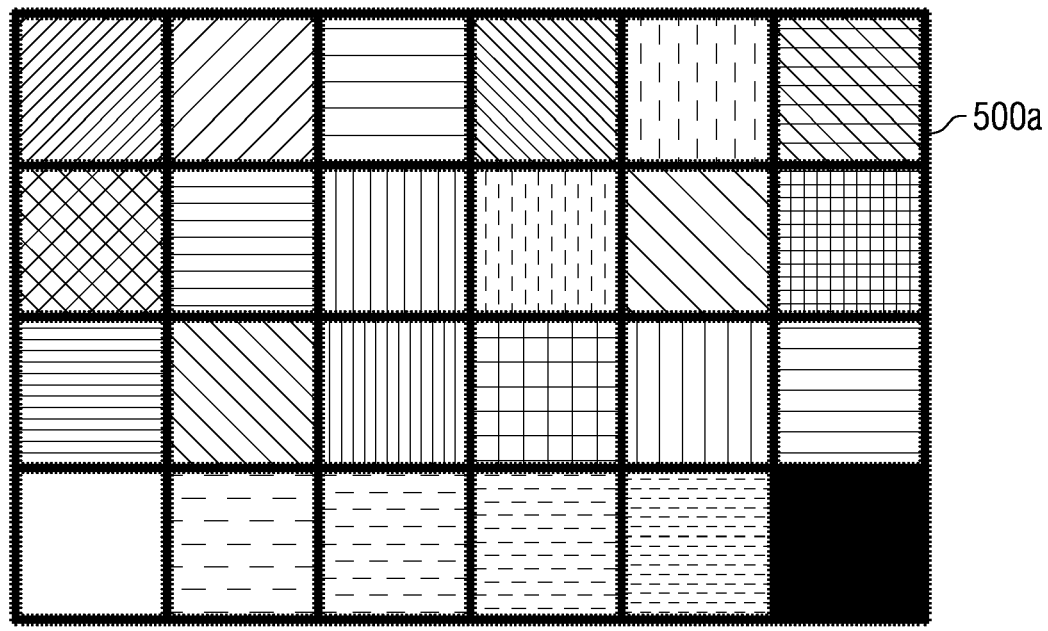
FIGS. 5a-5b are results of an embodiment of an image enhancement method.
Figure 5B:
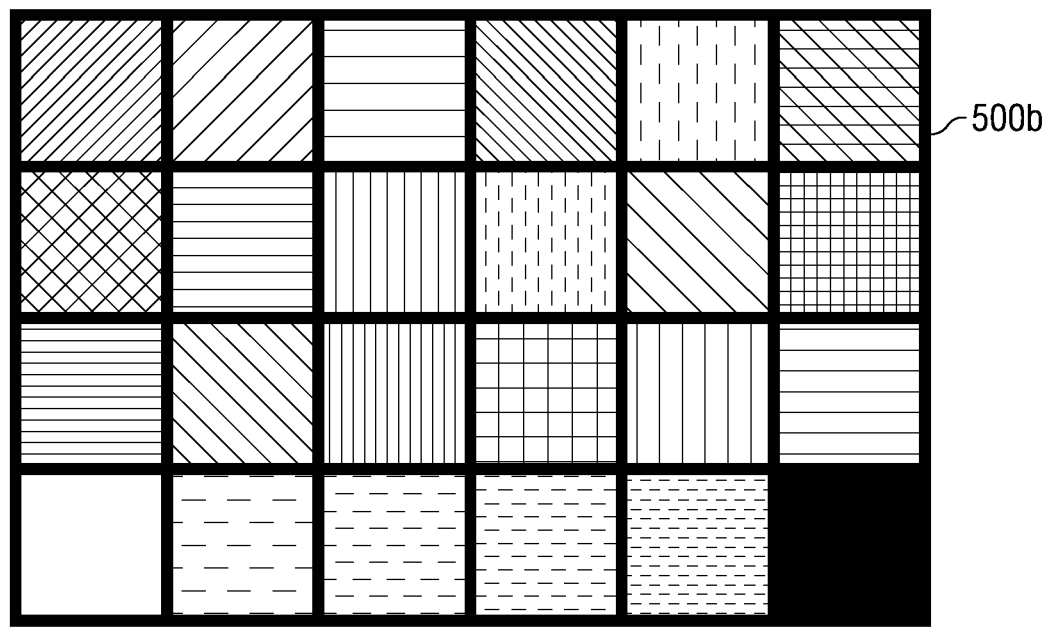

FIGS. 5*a*-5*b* are results of an embodiment of an image enhancement method. The image 500*a* of FIG. 5*a* is processed utilizing the method 400 of FIG. 4 to produce image 500*b* of FIG. 5*b*. As such, FIG. 5*a* depicts the original of an exemplary image and FIG. 5*b* is the enhanced image of FIG. 5*a*.

While the foregoing is directed to embodiments of the present invention, other and further embodiments of the invention may be devised without departing from the basic scope thereof, and the scope thereof is determined by the claims that follow.

What is claimed is:

1. A method of enhancing an image, comprising:
   applying at least one multi-scale filter bank to at least a portion of an image to detect at least one edge at different scales; and
   combining the detected edges with said image to yield an enhanced to at least a portion of the image;
   creating a multi-scale representation of at least a portion of an image; and
   applying a nonlinear mapping on a multi-scale highpass subband coefficient.

2. The method of claim 1, wherein the multi-scale representation of at least the portion of the image and the nonlinear mapping on the multi-scale highpass subband coefficient are utilized to create the enhanced to at least a portion of the image.

3. The method of claim 1, wherein the method is utilized to at least one of detecting noise, ignoring noise, detecting weak edges, enhancing weak edges, detecting strong edges, or ignoring strong edges.

4. An image enhancing apparatus, comprising:
   means for applying at least one multi-scale filter bank to at least a portion of an image to detect at least one edge at different scales; and
   means for combining the detected edges with said image to yield an enhanced to at least a portion of the image.

5. The method of claim 4, wherein the means for applying multi-scale filter banks step comprises:
   means for creating a multi-scale representation of at least a portion of an image; and
   means for applying a nonlinear mapping on a multi-scale highpass subband coefficient.

6. The method of claim 5, wherein the multi-scale representation of at least the portion of the image and the nonlinear mapping on the multi-scale highpass subband coefficient are utilized to create the enhanced to at least a portion of the image.

7. The method of claim 4 wherein the image enhancing apparatus is utilized to at least one of detecting noise, ignoring noise, detecting weak edges, enhancing weak edges, detecting strong edges, or ignoring strong edges.

8. A non-transitory computer readable medium having instructions stored thereon that, when executed by a processor, causes the processor to perform a method of enhancing at least a portion of an image, the method comprising:
   applying at least one multi-scale filter bank to at least a portion of an image to detect at least one edge at different scales; and
   combining the detected edges with said image to yield an enhanced to at least a portion of the image;
   creating a multi-scale representation of at least a portion of an image; and
   applying a nonlinear mapping on a multi-scale highpass subband coefficient.

9. The non-transitory computer readable medium of claim 8, wherein the multi-scale representation of at least the portion of the image and the nonlinear mapping on the multi-scale highpass subband coefficient are utilized to create the enhanced to at least a portion of the image.

10. The non-transitory computer readable medium of claim 8, wherein the method is utilized to at least one of detecting noise, ignoring noise, detecting weak edges, enhancing weak edges, detecting strong edges, or ignoring strong edges.

* * * * *